May 12, 1959  H. H. WENDELA  2,886,270
FASTENING DEVICE
Filed Dec. 28, 1953

INVENTOR
Hugo H. Wendela
BY
L. D. Burch

United States Patent Office 2,886,270
Patented May 12, 1959

2,886,270
FASTENING DEVICE

Hugo H. Wendela, Detroit, Mich., assignor to General Motors Corporation, Detroit, Mich., a corporation of Delaware Application December 28, 1953, Serial No. 400,429

2 Claims. (Cl. 248—74)

This invention relates to fasteners, and more particularly to fasteners for securing cables and the like to supporting members.

In electrical and mechanical installations it is often necessary to secure insulated conductors, tubing, armored control cables and similar elongated objects to a supporting panel. Many such installations are mass produced, and they are subjected to vibration or other severe conditions when in use. This requires that the fasteners employed for this purpose be inexpensive to manufacture and still perform satisfactorily in the face of these conditions.

Many fasteners adapted to secure such objects have been used. Some of these fasteners have been rather expensive to produce, and others have not performed satisfactorily, particularly in the case of fasteners used to secure an armored control cable.

Bowden wire is an example of such an armored control cable. When the control knob or handle is operated, the control cable is moved back and forth within the coiled wire armor or sheath. Unless the armor is prevented from moving also, the control knob may be difficult to operate, especially if the cable becomes looped or otherwise distorted to unduly bend the cable. Because of this tendency of the armor to move also, the fastener is more likely to become loosened and to rotate than in the case of the fastening of a stationary electrical cable for example.

It is now proposed to provide a fastener of the type and for the purpose above described which will function more efficiently than those now used. The fastener may be sprung in securing the device to the supporting panel, thereby increasing the grip of the cable engaging means on the cable and preventing the loosening of the fastener from the panel. The proposed fastener is less expensive to manufacture because it is of simple structure and shape, and it has novel cable engaging means provided thereon which positively prevent axial movement of the cable armor or any other object engaged thereby. In one form of the proposed fastener, means may be provided for preventing the rotation of the fastener about the point of attachment to the panel.

Figure 1:
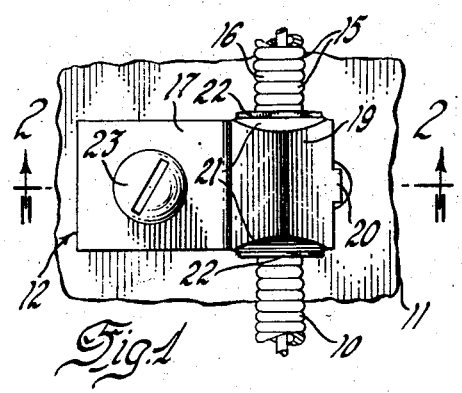
Figure 1 is a top plan view of a fastener installation embodying the invention.
Figure 2:
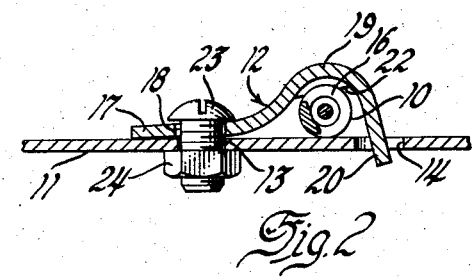
Figure 2 is a cross-sectional view taken along the plane of line 2—2 of Figure 1 and looking in the direction of the arrows.
Figure 3:
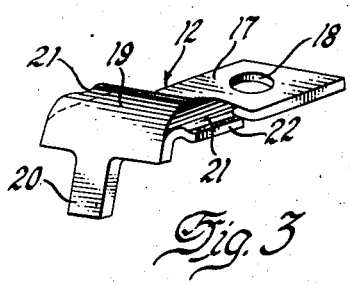
Figure 3 is a perspective view of the fastener employed in the installation shown by Figure 1.

Referring to the drawings in more detail, and particularly to Figures 1–3, a Bowden type cable 10 or other wire may be secured to support panel 11 by means of a fastener 12. Panel 11 may be provided with apertures 13 and 14, and cable 10 may have grooves 15 between spiral wires 16 thereof. The cable 10 may extend across the panel 11 between the apertures 13 and 14. Fastener 12 may be formed from a strip of sheet metal of constant width to provide an originally flat end portion 17 having aperture 18, arched portion 19, and projection 20. It will be observed that the ends 21 of the arched portion 19 are formed inwardly toward the axis of the arched portion 19 to provide cable engaging edges 22. Edges 22 may extend beyond lateral edges of the flat end portion 17, as shown by Figure 1, due to the thickness of the metal and to distortion of the metal during the forming of ends 21.

In securing cable 10 to panel 11, fastener 12 is applied so that aperture 18 registers with aperture 13, cable engaging edges 22 engage cable 10, and projection 20 enters aperture 14. A fastener such as bolt 23 may then be passed through apertures 13 and 18, and nut 24 may be tightened. When this is done the originally flat end portion 17 may be sprung toward panel 11, as shown by Figure 2, thereby indicating that sufficient pressure has been applied to the cable engaging edges 22 so that they at least partially enter grooves 15 in cable 10. Thus cable 10 may not be moved axially due to edges 22, and fastener 12 may not be rotated about bolt 23 due to projection 20. The resistance of portion 17 to springing maintains sufficient pressure on the threads of bolt 23 to aid in preventing the loosening of nut 24.

Figure 4:
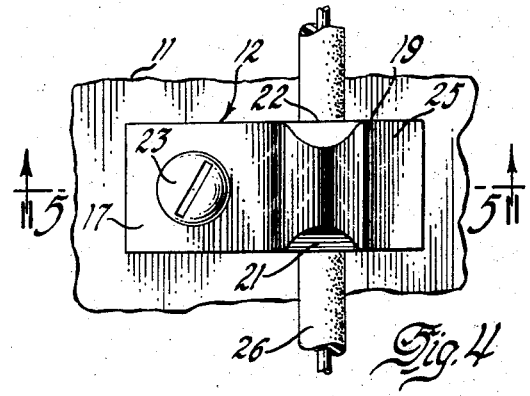
Figure 4 is a top plan view of a fastener installation embodying a modification of the invention.
Figure 5:
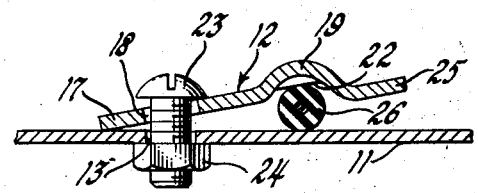
Figure 5 is a cross-sectional view taken along the plane of line 5—5 of Figure 4 and looking in the direction of the arrows.
Figure 6:
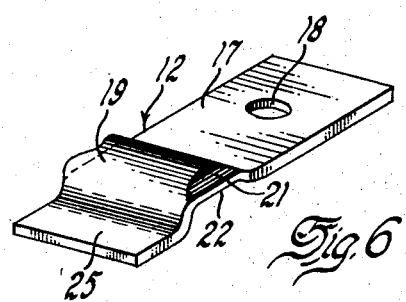
Figure 6 is a perspective view of the fastener employed in the installation shown by Figure 4.

The modification shown by Figures 4–6 is similar to the structure shown by Figures 1–3, except that the projection 20 is not provided on fastener 12. The projection 20 may if desired be replaced by a lower flat portion 25 to provide a smooth open end and to prevent the wire from shifting out of the open end. Because projection 20 is eliminated, aperture 14 is not provided in panel 11. This form of fastener is suitable for securing an insulated wire 26 or the like where axial movement of the wire is not likely to occur so that it is not necessary to insure that the fastener 12 does not rotate about bolt 23. In all other respects, however, the operation of both forms of the fastener is the same. Figure 5 illustrates flat end portion 17 before it is sprung toward panel 11, or where it need not be appreciably sprung if the insulated wire 26 is sufficiently soft so that edges 20 readily bite into the insulation.

Thus there has been provided a fastening device for securing cables and the like which is inexpensively manufactured from a strip of sheet metal because of its simple shape and structure. The cable or other object and the fastener are better secured to a support by reason of the resistance to springing of a portion of the fastener.

What is claimed is:

1. A cable clamp formed from a strip of material having a constant width, said clamp comprising a flat end portion having an aperture formed therethrough for receiving clamp securing means and an arched portion extending arcuately and upwardly out of the plane of said flat end portion and continuing arcuately and downwardly so as to intersect the plane of said flat end portion for receiving thereunder the cable to be clamped, said arched portion having the side edges thereof formed angularly and radially inward toward the plane of said flat end portion to provide angularly disposed flat bevel surfaces terminating in cable engaging edges extending chordally of said arched portion and generally parallel to the plane of said flat end portion, said cable engaging edges providing the only lines of contact with the cable being clamped.

2. A cable clamp formed from a strip of material having a constant width, said clamp comprising a flat end portion having an aperture formed therethrough for receiving clamp securing means, an arched portion extending arcuately and upwardly out of the plane of said flat end portion and continuing arcuately and downwardly so as to intersect the plane of said flat end portion for receiving thereunder the cable to be clamped, and a terminal projection extending downwardly from the end of said arcuate portion and substantially beyond the plane of said flat end portion, said arched portion having the side edges thereof formed angularly and radially inward toward the plane of said flat end portion to provide angularly disposed flat bevel surfaces terminating in cable engaging edges extending chordally of said arched portion and generally parallel to the plane of said flat end portion, said cable engaging edges extending laterally beyond the sides of said flat end portion and providing the only lines of contact with the cable being clamped.

References Cited in the file of this patent

UNITED STATES PATENTS

| | | |
|---|---|---|
| 1,772,687 | Reinke | Aug. 12, 1930 |
| 1,855,471 | Buchanan | Apr. 26, 1932 |
| 1,872,974 | Kohr | Aug. 23, 1932 |
| 2,334,706 | Ingalls | Nov. 23, 1943 |

FOREIGN PATENTS

| | | |
|---|---|---|
| 145,256 | Great Britain | of 1920 |
| 500,244 | Canada | Mar. 2, 1954 |
| 732,157 | France | June 6, 1932 |